United States Patent
Azevedo (12)

(10) Patent No.: US 6,667,031 B2
(45) Date of Patent: Dec. 23, 2003

(54) METHOD FOR CURING CYANOACRYLATE ADHESIVES

(75) Inventor: Max Azevedo, Lenoir, NC (US)

(73) Assignee: Spartan Products, Inc., Rye, NY (US)

( * ) Notice: Subject to any disclaimer, the term of this patent is extended or adjusted under 35 U.S.C. 154(b) by 27 days.

(21) Appl. No.: 10/101,346

(22) Filed: Mar. 20, 2002

(65) Prior Publication Data

US 2003/0158580 A1 Aug. 21, 2003

Related U.S. Application Data

(63) Continuation-in-part of application No. 10/077,852, filed on Feb. 20, 2002.

(51) Int. Cl.$^7$ .......................... C08F 6/28; A61K 31/78; A61K 9/70
(52) U.S. Cl. .................. 424/78.03; 424/443; 427/2.31; 523/118; 528/482; 528/492; 606/214
(58) Field of Search ............................. 424/78.03, 443; 427/2.31; 523/118; 528/482, 492; 606/214

(56) References Cited

U.S. PATENT DOCUMENTS

| | | | |
|---|---|---|---|
| 2,912,454 A | 11/1959 | McKeever | 260/465.4 |
| 3,667,472 A | 6/1972 | Halpern | 128/334 R |
| 3,903,055 A * | 9/1975 | Buck | 526/194 |
| 3,975,422 A | 8/1976 | Buck | 260/465.4 |
| 3,995,641 A | 12/1976 | Kronenthal et al. | 128/335 |
| 4,003,942 A | 1/1977 | Buck | 260/464 |
| 4,012,402 A | 3/1977 | Buck | 260/448.2 |
| 4,013,703 A | 3/1977 | Buck | 260/464 |
| 4,041,063 A | 8/1977 | Buck | 260/465.4 |
| 4,057,535 A | 11/1977 | Lipatova et al. | 260/77.5 AC |
| 4,328,170 A | 5/1982 | Okawara et al. | 260/465.4 |
| 4,444,933 A | 4/1984 | Columbus et al. | 524/292 |
| 4,818,325 A | 4/1989 | Hiraiwa et al. | 156/315 |
| 5,039,753 A | 8/1991 | Woods et al. | 525/330.3 |
| 5,192,536 A | 3/1993 | Huprich | 424/78.08 |
| 5,254,132 A | 10/1993 | Barley et al. | 606/214 |
| 5,328,687 A | 7/1994 | Leung et al. | 424/78.35 |
| 5,403,591 A | 4/1995 | Tighe et al. | 424/445 |
| 5,684,042 A | 11/1997 | Greff et al. | 514/527 |
| 5,807,563 A | 9/1998 | Askill et al. | 424/402 |
| 5,928,611 A | 7/1999 | Leung | 422/131 |
| 5,944,754 A | 8/1999 | Vacanti | 623/11 |
| 5,981,621 A | 11/1999 | Clark et al. | 523/118 |
| 6,086,906 A | 7/2000 | Greff et al. | 424/407 |
| 6,090,397 A | 7/2000 | Lee et al. | 424/405 |
| 6,099,807 A | 8/2000 | Leung | 422/131 |
| 6,143,352 A | 11/2000 | Clark et al. | 427/2.1 |
| 6,143,805 A | 11/2000 | Hickey et al. | 522/152 |
| 6,217,603 B1 | 4/2001 | Clark et al. | 606/214 |
| 6,245,933 B1 | 6/2001 | Malofsky et al. | 558/381 |
| 6,248,800 B1 | 6/2001 | Greff et al. | 521/71 |
| 6,310,166 B1 | 10/2001 | Hickey et al. | 526/348.2 |
| 2003/0077386 A1 * | 4/2003 | Azevedo | 427/207.1 |

FOREIGN PATENT DOCUMENTS

WO  WO 96/14292  * 5/1996

OTHER PUBLICATIONS

Collins, J.A. et al., "Biological Substrates and Cure Rates of Cyanoacrylate Tissue Adhesives", Archives of Surgery, vol. 93, Iss. 3, Sep. 1966, pp. 438–32.
Leonard, F. et al., "Interfacial Polymerization of n–Alkyl x–Cyanoacrylate Homologs", Journal of Applied Polymer Science, vol. 10, Iss. 11 Nov. 1996, pp. 1617–23.
Woodward, S.C. et al., "Histotoxicity of Cyanoacrylate Tissue Adhesives in the Rat", Annals of Surgery, vol. 162, Iss. 1, Jul. 965, pp. 113–22.
Cameron, J.L. et al., "Degradation of Cyanoacrylate Tissue Adhesive, pt. 1", Surgery, vol. 58, Iss. 2, Aug. 1965, pp. 424–30.
Leonard, F. et al., "Synthesis and Degradation of Poly(alkyl x–Cyanoacrylates)", Journal of Applied Polymer Science, vol. 10, Iss 2, Feb. 1966, pp. 259–72.
Leonard, F. et al., "Synthesis and Degradation of Poly(alkyl x–Cyanoacrylates)", Journal of Applied Polymer Science, vol. 10, Iss 2, Feb. 1966, p. 1214.
Lehman, R.A.W. et al., "Toxicity of Alkyl 2–Cyanoacrylates, Pt. 1", Archives of Surgery, vol. 93, Iss 3, Sep. 1966, pp. 441–46.
Yonezawa, M. et al., "Studies on x–Cyanoacrulate, Pt. 6: Reaction of Cyanoacetate with Formaldehyde" Yuki Gosei Kagaku Kyokaishi, vol. 25, Iss 4, Apr. 1967, pp. 311–16.
Leonard, F, "Hemostatic Applications of Alpha Cyanoacrylates: Bonding Mechanism and Physiological Degradation of Bonds", Adhesion in Biological Systems, ed. R.S. Manly, 1970, pp. 185–199.
Vezin, W.R. et al., "Diffusion of Small Molecules in Poly–n–Alkyl Cyanoacrylates", Journal of Pharmacy and Pharmacology, vol. 30, Iss Suppl, Dec. 1978, p. 2P.
Vezin, W.R. et al., "In Vitro Heterogeneous Degradation of Poly(n–Alkyl x–Cyanoacrylates)", Journal of Biomedical Materials Research, vol. 14, Iss 2, Mar. 1980, pp. 93–106.
Tseng, Y.C. et al., "Modification of Synthesis and Investigation of Properties for 2–Cyanoacrylates", Biomaterials, vol. 11, Iss 1, Jan. 1990, pp. 73–79.

* cited by examiner

*Primary Examiner*—Donald R. Wilson
(74) *Attorney, Agent, or Firm*—Welsh & Flaxman LLC

(57) ABSTRACT

A new adhesive method using an adhesive composition including cyanoacrylate adhesive and a stabilizing agent to join together portions of a substrate, particularly useful in suturing and similar medical procedures, is disclosed. It is based on the discovery that remarkable improvements are obtained by adding a step of removing stabilizing agent from such adhesive compositions in the manufacturing process with the prior known steps of (a) providing an adhesive composition including cyanoacrylate adhesive and a stabilizing agent, (b) presenting a substrate to receive at least a portion of such cyanoacrylate adhesive and (c) applying such portion to the substrate. Devices for use in performing the method are described.

16 Claims, No Drawings

METHOD FOR CURING CYANOACRYLATE ADHESIVES

CROSS REFERENCE TO RELATED APPLICATION

This application is a continuation-in-part of U.S. patent application Ser. No. 10/077,852, filed Feb. 20, 2002, entitled "Method for Curing Cyanoacrylate Adhesive", which is currently pending. This application relates to U.S. patent application Ser. No. 09/982,226, filed Oct. 19, 2001, which is currently pending.

BACKGROUND OF THE INVENTION

1. Field of the Invention

This invention relates broadly to a method of treating stabilized cyanoacrylate adhesives prior to their application to a substrate, particularly with reference to medical procedures using such adhesives.

2. Description of the Prior Art

Medical interest in cyanoacrylate polymers has been apparent since at least the mid-nineteen sixties as evidenced by numerous reports on its use as a tissue bonding agent. Collins et al. reported on the effectiveness of homologous chain cyanoacrylates for bonding of biological substrates. J. A. Collins, et al., ARCH. SURG. Vol. 93, 428 September 1966; F. Leonard et al., J.A.P.S. Vol. 10: 1617, 1966. Both articles report the observation of high rates of polymerization with longer chain esters than with the methyl or ethyl monomers. There appeared to be more biocompatability with the longer chains as noted by the ease of spreading monomer films on bio-substrates. This contrasted with in vitro polymerizations where the lower homologues reacted much faster. There was particular interest in the degradation of these polymers as they related to possible harmful effects that would preclude their use in surgery.

Woodward et al. reported histotoxicity of these monomers in rat tissue. S. C. Woodward, et al., ANN. SURG. Vol. 162, July 1965. The study involved in situ polymerization of three cyanoacrylate monomers: methyl, hexyl, decyl. It was reported that histotoxic effects were greatest with methyl and decreased with the other two monomers.

The same group reported on the use of radioactive methyl cyanoacrylate for monitoring routes for the loss of the polymer. J. J. Cameron et al., SURGERY, Vol. 58, August 1965; C. H. McKeever, U.S. Pat. No. 2,912,454, Nov. 10, 1950. Results indicated that the polymer was degraded and excreted principally through the urine and feces. Analysis of the animal's organs revealed no signs of radioactivity. This implied no degradation products were incorporated into any of the animal's metabolic pathways. By analogy to polyvinylidene cyanide, they noted that the cyanoacrylate polymer degraded in the presence of water and more so in the presence of bases. The first observed degradation product turned out to be one of the starting materials, i.e., formaldehyde. In vitro studies have shown that the polymers degrade via hydrolytic scission in homogeneous as well as heterogeneous conditions. F. Leonard et al., J.A.P.S., Vol. 10: 259, 1966. These degradation products were confirmed to be formaldehyde and the corresponding cyanoacetate. The conditions of solution degradation affected the consequent rates, namely, under neutral conditions rates decreased as the homologous series was ascended while alkaline conditions increased all rates.

The same study reported that the hydroxyl group was evident in the polymer as the initiating species. This was concluded from infrared spectral data that displayed hydroxyl group absorption at 3600 cm(−1). Further support for this is the noted suppression of the OH as water is replaced with methanol and the observed methoxy absorption at 1100 cm (−1). Preferential initiation was shown to occur with NH2 containing substances such as pyridine, cysteine, alanine, and glycine in aqueous solutions. This suggested that in vivo adhesion was more than a mechanical interlocking of the solid polymer with the tissue. This appears to be the case as it was noted that typical polymer solvents were not effective in solvating tissue-bound polymer.

From this it appears that in vivo studies of degradation do not necessarily correspond to in-vitro conditions. Part of the degradation mechanism relies on the conditions of the polymer for hydrolytic scission. The chemical bonding of the polymer excludes this surface from hydrolytic activity. A mechanism of degradation was proposed that suggests an action similar to unzipping in acrylics, however, the difference being that the monomer is not regenerated. The proposed mechanism necessitates the presence of the hydroxyl as well as the presence of water.

An unusual effect was reported regarding the aqueous degradation of isobutyl cyanoacrylate. R. H. Lehman et al., ARCH SURG. Vol. 93: 441, 1966. Of the monomers tested (methyl, propyl, butyl, isobutyl, heptyl, octyl), it was the only one that degraded more rapidly than any of the unbranched homologues, with the exception of the methyl monomer. as a tissue adhesive in surgical applications. The presumed superiority of these products was attributable to the rapid hydrolytic decay and concurrent low degree of histotoxicity. Since no data is presented regarding formaldehyde evolution, it is presumed that the hydrolysis mechanism does not scission the polymer to generate it.

A second study reported that in vivo experimentation gives credence to the chain scission mechanism by hydrolysis. M. Yonezawa et al., YUKI GOSEI KAGAKU KYOKAISHI, Vol. 25, 1967. When beta-(14) carbon tagged cyanoacrylate is implanted in rats, radioactive urea is isolated from urine. This suggest that tagged fromaldehyde is released, converted to carbon dioxide and in turn reacts with ammonia to produce urea. F. Leonar, ADHES. BIOL. SYS. 1970.

Rates of degradation on ethyl, butyl and hexyl cyanoacrylates were evaluated with regards to molecular weights, concentrations, and side chain structures. W. R. Vezin et al.,J. PHARM. PHARMACOL., Vol. 30,1978, suppl.. The method employed buffered systems of pH ranges from 5.97 to 7.88. As expected, the rates increased with increasing pH Scanning electron microscopy of the degraded polymer indicated that reaction occurs at the surfaces and not internally through diffusion. It was postluated that the greater the length of the -alkyl side chain, the more protection provided to the labile hydroxyl end of the polymer chain. This is turn would provide greater resistance to degradation of the polymer. Degradation for hexyl, butyl, and ethyl were, respectively, 1.0, 1.36, 9.55.

The same group reported on a study whereby degradation rates were retarded by increasing the chain length of the polymer. W. R. Vezin et al., J. BIOMED. MAT. RES., Vol. 93,1980. Very small quantities of impurities in the monomers had a significant impact on the final outcome of the degree of polymerization. Further to this study, within the ethoxyethyl system, loneger chain length enhanced the degradation resistance of the resultant polymer.

A comparative study of ethyl cyanoacrylate and polyurethane in-situ generated adhesives and coatings was reported in U.S. Pat. No. 4,057,535 to Lipatova et al. The study claimed the superiority of the polyurethane structure due to high flexibilty and compatibility with the treated tissues. The single comparison was made with incised tissue and consequent application between the wound edges. Inferiority of this application for the cyanoacrylate was readily evident, but true topical applications were not compared. eleven examples given, four were of a topical method, yet no data was presented as no application of the ethyl or any other homologue was done conjunctively for comparative efficacy. A further deficiency of this patent is the practicality of use. No indication is given for a device to properly apply the two part system and appears to indicate an at-site preparation.

Another patent, U.S. Pat. No. 5,192,536 to Robinson overcomes the issue of the apparent difficulties associated with invention disclosed in U.S. Pat. No. 4,057,535 by taking preformed polyurethane and issolving it in a rapidly evaporating solvent such as tetrahydrofuran. The composition is designed to form a "membrane-like cover over the wound" and "assists in maintaining closure of the wound". Again no compartative studies were reported.

U.S. Pat. No. 3,995,641 to Kronenthal et al. discusses the novelty of modified cyanoacrylates, namely, carbalkoxyalkyl cyanoacrylates. The patent disclose their usefulness as a tissue adhesive in surgical applications. The presumed superiority of these products was attributable to the rapid hydrolytic decay and concurrent low degree of histotoxicity. Since no data is presented regarding formaldehyde evolution, it is presumed that the hydrolysis mechaniasm does not scission the polymer to generate it.

U.S. Pat. No. 5,254,132 to Bartley et al. discloses the use of a hybrid method of surgical application of cyanoacrylates. It discloses a combination of sutures and adhesive such as to be mutually isolated from each other, but to both support the re-growth of the tissue in the wound area. The '132 patent addresses the issue of insuring no contact of adhesive in the suture area so as to assure no inclusions of the cyanoacrylate. The disclosed method appears to be awkward and cumbersome, and requires a very effective and controlled dispensing of the adhesive without contacting the suture. Additional concern is indicated as a suggestion is made to employ a solvent (acetone) if any surgical instrument happens to be bonded inadvertently to the treated area.

U.S. Pat. No. 5,328,687 to Leung et al. attacks the formaldehyde issue by incorporating a formaldehyde scavenger, such as, sodium bisulfite. The various compositions were evaluated via in-vitro experimentation. The examples presented all had a presumably excessive level of scavenger. The representative compositions had loadings of 20% of a scavenging agent that was designed to offset formaldehyde emissions that were at 0.1%. As indicated previously, in-vitro and in vivo conditions are not identical and certainly not in this instance. The in-vitro conditions presented in the '687 patent do not factor in the dynamic conditions in living tissue. The surgically treated area would be under continuous and changing fluids as the organ attempts to bring in the necessary biocomponents to heal the traumatized tissue. As such, it would not be expected that the scavenger/formaldehyde ratio would be maintained as it was in the in-vitro state. It could be speculated that the use of such high loadings of any fluid solubilized additives would contribute to greater formaldehyde emissions. This can be assumed to be a consequence of dissolution of the additives resulting in cavities in the polymer, thereby promoting greater surface area for hydrolytic degradation.

U.S. Pat. No. 5,403,591 to Tighe et al. relates to the use of cyanoacrylates for treatment of skin irritations that progress to ulcerations. It would be assumed that these conditions could be considered wound formations, e.g., see U.S. Pat. No. 3,995,641.

U.S. Pat. No. 5,928,611 to Leung, U.S. Pat. No. 5,981,621 to Clark et al., U.S. Pat. No. 6,099,807 to Leung, U.S. Pat. No. 6,217,603 to Clark et al. describe methods of inducing cure of cyanoacrylates bypassing the adhesive through a porous applicator tip containing substances that initiate the polymerization. These substances co-elute and dissolve into the adhesive as it is forced through the porous tip.

U.S. Pat. No. 6,143,352 to Clark et al. describes methods of altering the pH environment of cyanoacrylates in order to attenuate or accelerate the rate of hydrolytic degradation by uses of acid and alkaline additives. The formulation of acidic modifiers is problematic as they tend to inhibit the primary characteristic of these materials, namely, rapid cure on application to tissue. Data is presented on effects of acidic compositions on previously cured cyanoacrylates, not on in situ applied compositions.

All of these methods rely on the addition of various compositions to affect the accelerated cure onto a desired substrate. These compositions may induce polymerization by creating a greater number of initiation sites and or orientation of the monomer for more facile polymerizations. Other plausible mechanisms can be evoked, but the fact remains that the added materials become a part of the composition (undesirable for many medical applications). As such, these chemical inclusions may elicit unfavorable reactions in the cured state. In particular, the use of pH-based accelerators may contribute to the alkaline hydrolysis of the cyanoacrylate polymer.

This is particularly undesirable in medical applications of the cyanoacrylates as the hydrolysis results in the evolution of formaldehyde. A certain level of formaldehyde can be tolerated by tissue as it is able to dispose of reasonable concentrations. A solution proposed in the prior art has been increasing the chain length of the cyanoacrylate monomer side group; in particular, that it be alkyl so as to impart hydrophobic character to the resulting polymer.

The prior art methods and compositions have been able to achieve a synthesis of the octyl cyanoacrylate at economic levels for applications in the medical field, although improbable for uses in commercial applications due to reaction yields. A number of methods have been attempted to improve yields. Yin-Chaos Tseng et al., BIOMATERIALS, Vol 11, 1990. The variables looked at included: azeotropes, temperature and formaldehyde/cyanoacetate ratio. Other methods have also included assessment of different catalysts for the condensation reaction. Regardless of the methods tried, yields become increasingly smaller as the cyanoacetate pendant group becomes larger.

An attempt to improve yields is reported in U.S. Pat. No. 6,245,933 to Malofsky. This method attempts to avoid yield losses by producing the high yield cyanoacrylate prepolymers of the lower homologues (methyl & ethyl) and then proceed through a transesterification with a longer chain alcohol such as the octyl. Three reported examples with 2-octanol gave yields ranging from 21.8% to 36.2% of crude monomer.

From this, it can be seen that high yields are difficult and no doubt subsequent work-up to medically acceptable products result in even lower product output. The difficulty with methods such as discussed above, is the undesirable side products which are difficult to remove from the main stream. In particular, it is difficult to achieve complete transesterification reactions on polymeric moieties because of steric obstruction. As a consequence, purity is compromised as the initial cyanoacrylate prepolymer is not completely reacted and the lower homologue co-distills with the desired product.

Other additives have been used to attenuate various properties, such as modulus (elasticity), viscosity, thermal resistance, etc. Each and every additive becomes a substance that must be removed by the surrounding tissue, which generally does not assist in recovery of the damaged area. In that regard, the addition of these additives must weigh the effect of property improvements against the effect on tissue compatibility.

In contrast to additives for the cured adhesives are additives formulated into the synthesized monomers. The synthetic route for monomer production relies on two principal groups of stabilizers. The first group is chosen from substances capable of preventing free radical polymerization and the second group inhibits the anionic polymerization.

The critical step in the production of these monomers relies on the high temperature thermal degradation of the polymer generated from the formaldehyde-cyanoacetate reaction. These temperatures span the range of 150° C. to excesses of 200° C. Under ideal conditions, this polymer will undergo a clean unzipping reaction that releases the cyanoacrylate monomer. This begins to take place in the lower temperature regions and must be gradually elevated to extract the increasingly difficult boiling off of the monomer. Elevation of the temperature is necessary as byproducts form and increasingly hamper the volatilization of the desired monomer.

In order to prevent the thermal reversal of the monomer back to polymer as it is generated and exits the body of fluid polymer in the reaction vessel, retarders or inhibitors are added at the beginning of this process. These substances react with free radicals to form a stable unreactive species, thereby halting the thermal polymerization typical of vinyl monomers. Quinones are the most often used substances in this group. Typical, but not exclusive, are hydroquinone and methyl ether hydroquinone. The presence of these additives is most critical in the monomer-polymer mix in the reaction vessel. Once the monomer is vaporized, it is quickly cooled to ambient conditions as it is distilled over to a suitable receiver.

The second group of stabilizers are used to prevent the anionic polymerization of the monomer in the reaction vessel as well as the vapor and collected liquid monomer in the receiver. Those knowledgeable in the art are quite familiar with these substances. Typical, and again, not exclusive, are the sulfonic acids and sulfur dioxide. In general, acidic substances are chosen to effect stabilization not only during the production of these monomers but further for stabilization during storage.

A fine line exists in the levels of these anionic stabilizers. If there is insufficient loading of these acids during the polymer unzipping to monomer, the vaporized and condensing monomer will begin to repolymerize throughout the system. On the other hand, if too much anionic stabilizing takes place in the distilled monomer, the desired repolymerization is not easily accomplished. This is evidenced by those patents cited above that deal with the loading of alkaline substances and other anion polymer promoting initiators in a porous tip. These additives are necessary to overcome the excessive levels of anionic stabilizers that co-distill during the distillation of monomer.

In the manufacture of the lower homologues such as the methyl, ethyl, and butyl monomers, the degradation of the polymer to monomer is much more effective and gentle, requiring lower levels of these anionic stabilizers. The resultant distilled monomers are thereby stabilized sufficiently and in some cases additional acid is charged, usually under 100 parts per million, to effect a useful shelf life for commercial applications.

These lower homologues are, as are all of the cyanocarylates (with some exceptions such as the difunctional ones), distilled under vacuum conditions. The typical vacuum is in the 0.5 mm Hg to 2.0 mm Hg. As the molecular weight of these monomers increases, the required vacuum conditions become more critical. In order to effectively distill the higher molecular weights, the vacuum conditions must continue beyond the range of approximately 0.5 mm Hg. Higher distillation temperatures with poor vacuum conditions results in increasing levels of undesirable byproducts, and consequent poor yields and inferior product.

As a typical example, it is necessary to achieve a vacuum in the range of approximately 0.01 mm Hg to 0.05 mm Hg for the octyl monomer and higher homologues in order to effectively distill the monomers in a nondestructive process. This, however, is the crux of the problem in the isolation of these monomers as confronted in the prior art methods and systems.

The lower homologues and typical anionic stabilizers have a sufficiently large difference in their respective boiling points, such that very little stabilizer is co-distilled with the monomer. This, however, becomes an increasingly important issue as the vacuum levels proceed to better distill over the higher boiling monomers like the octyl, decyl and so on. The consequence then is that increasing levels of the stabilizer co-distill along with the desired monomer. The resultant isolated monomer is excessively loaded with anionic stabilizer(s) thus requiring the devices referred to above.

In addition, and as generally discussed above, prior art methods for the synthesis of cyanoacrylate monomers generally require the addition of acids and free radical inhibitors during the monomer synthesis. The free radical inhibitors prevent premature polymerization during the thermal unzipping reaction as well as the follow-up distillation step(s). The acid additives are necessary to prevent premature polymerization during workup and storage of these compositions. However, and as discussed above, as the chain lengths become increasingly longer, higher temperatures are necessary to effect the unzipping reaction. A direct unintended result is that excessive levels of acid are necessary with the consequent overstabilization of the distilled product.

It, therefore, becomes necessary to negate this overstabilization in order to facilitate the anionic polymerization. To date, all means of effecting this have been by pretreatment of the substrate with, for example, alkaline and/or organic soluble amines that are intended to initiate the anionic polymerization by dissolution into the adhesive. Though not specifically stated, this approach is apparently based on the view that as the mass of the side chain group increases, the polymerizability drops off. This is apparent, as all current techniques rely on overriding the excess stabilizer levels. Alternative methods employ a solution of these initiators being sprayed over the adhesive after it has been applied to the substrate. The other variant of this soluble initiator method are those referenced above incorporating the initiator in the porous applicator tip. As those skilled in the art certainly appreciate, neither of these approaches is desirable for medical procedures.

With the foregoing in mind, a need currently exists for a method by which cyanoacrylate adhesives may be rapidly cured without contaminants or extraneous additive. The present invention provides such a method.

SUMMARY OF THE INVENTION

It is, therefore, a principal object of the present invention to provide a new and unobvious method for curing cyanoacrylate adhesives, permitting utilization of the resulting adhesives in the treatment of human, or animal, tissue and/or flesh, required to be otherwise sealed or sutured, or otherwise protected from its surroundings. The method has been developed so as to minimize the presence of contaminants and extraneous additives in the resulting cured medical adhesives.

It is further an object of the present invention to enhance the cure speed of stabilized cyanoacrylate adhesives by a treatment that removes excessive stabilizers prior to application onto the substrate. The present cyanoacrylate adhesives curing method allows for reduced levels of stabilizers therein to be formulated to provide commercially sufficient shelf life and improved speed of cure upon application. The present method also enhances the cure speed of cyanoacrylate adhesives by a destabilization treatment that purifies the cyanoacrylate prior to the application onto the substrate and results in the production of improved cyanoacrylate adhesives that exhibit greater biocompatibility as a consequence of modified polydispersity and longer monomeric chain groups, especially such adhesives that exhibit attenuated degradation of the polymer thereby exposing tissue contacting the adhesive to lower levels of formaldehyde. The present cyanoacrylate adhesives curing method further allows for formulating unadulterated adhesives containing no plasticizers while achieving the elastomeric properties necessary for bonded substrates undergoing multidimensional stresses.

The objects are achieved by an adhesive method comprising the steps of providing a long shelf life stable adhesive composition comprising cyanoacrylate adhesive and a stabilizing agent(s), presenting a substrate to receive at least a portion of the cyanoacrylate adhesive composition and applying the cyanoacrylate adhesive composition to the substrate. The method is further achieved by removing a predetermined quantity excess stabilizing agent(s) from the cyanoacrylate adhesive composition prior to application to the substrate.

Other objects and further scope of applicability of the present invention will become apparent from the detailed descriptions given herein; it should be understood, however, that the detailed descriptions, while indicating preferred embodiments of the invention, are given byway of illustration only, since various changes and modifications within the spirit and scope of the invention will become apparent to those skilled in the art from such descriptions.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

As discussed above, the present invention generally relates to a method for curing reactive monomeric cyanoacrylates to undergo macromolecular formations via appropriate modification of anionic stabilizer levels in a manner permitting utilization of the resulting adhesives in the treatment of human, or animal, tissue and/or flesh, required to be otherwise sealed or sutured, or otherwise protected from its surroundings. While certain distinctions maybe drawn between the usage of the terms "flesh" and "tissue" within the scientific community, the terms are used herein interchangeably as referring to a general substrate upon which those skilled in the art would understand the present adhesive to be utilized within the medical field for the treatment of patients. Without being bound to a specific mechanism, such modification of the anionic stabilizer levels chemically and/or physically removes stabilizing agents so the present method allows for reformulation of compositions capable of reasonable cure speeds without external anionic initiators.

The present method generally includes the steps of providing a long shelf life stable adhesive composition comprising cyanoacrylate adhesive and a stabilizing agent(s), removing excess stabilizing agent(s) from the adhesive composition, presenting a substrate to receive at least a portion of the cyanoacrylate adhesive composition and applying the cyanoacrylate adhesive portion to the substrate.

Cyanoacrylate adhesives that may be used in accordance with the present invention, comprise one or more monomers having the following general structure:

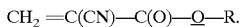

Without encumbering the body of this patent with specific examples of moieties, reference is made to the numerous patents delineating the myriad of groups that can be represented by the moiety designated as R, many representative examples being given in the cited references. With this in mind, these, as well as other moieties, may be employed without departing from the spirit of the present invention. In the case of difunctional bis cyanoacrylates, R would be bound to two reactive groups. These are, therefore, intended to define and be included by general reference to such prior art and by those knowledgeable thereof.

As discussed above in the Background of the Invention, the various methods for the synthesis of these monomers generally require the addition of acids and free radical inhibitors during the monomer synthesis. The free radical inhibitors prevent premature polymerization during the thermal unzipping reaction as well as the follow-up distillation step(s). The acid additives are necessary to prevent premature polymerization during work-up and storage of these compositions.

However, as the chain lengths become increasingly longer, higher temperatures are necessary to effect the unzipping reaction. A direct unintended result is that excessive levels of acid are necessary with the consequent overstabilization of the distilled product. It, therefore, becomes necessary to negate this overstabilization in order to facilitate anionic polymerization of the adhesive composition.

Prior art techniques rely upon pretreatment of the substrate with, for example, alkaline and/or organic soluble amines that are intended to initiate the anionic polymerization by dissolution into the adhesive. This approach is apparently based on the view that as the mass of the side chain group increases, the polymerizability drops off. This is apparent, as all current techniques rely on overriding the excess stabilizer levels. Alternative prior art methods employ a solution of these initiators being sprayed over the adhesive after it has been applied to the substrate. The other variant of this soluble initiator method are those referenced above incorporating the initiator in the porous applicator tip.

Since the difficulty in polymerization of these longer chain moieties is due to excessive acid levels, in accordance with the present invention the acids are removed rather than neutralized. As noted above, polymerization is achieved by the addition of initiators to overcome the stabilizing effects of these acids and so remain in the resultant polymer matrix. The concept of acid removal is also the focus of a co-pending U.S. patent application Ser. No. 09/982,226, filed Dec. 19, 2001, which is incorporated herein by reference. The '226 application describes the use of acid removing particulates during the coincidental application of these adhesives. The utility of this method is limited by a period of time in which the adhesive can be applied. It would be most desirable to have a greater degree of freedom in time to apply these adhesives.

This present method achieves this goal by removing stabilizers in cyanoacrylate adhesives prior to their application to substrates. This renders the resultant purified compositions highly susceptible to polymerizations when applied to the substrates. Again, without being bound to any single specific mechanism, this process relies on a combination of physical adsorption/absorption, chemical reaction, and hydrogen bonding of the acid group(s) onto particulate surfaces. It is necessary to have the acid removing particulate substances, in fluid contact with the excessively stabilized monomer(s), be insoluble or otherwise isolatable from the monomers, such as by filtration, centrifugation, phasing out, membrane separation, or other appropriate isolating mechanism. The requisite is the isolation of the acids or other stabilizers from the monomers.

Substances exhibiting these mechanisms encompass polymers capable of forming hydrogen bonds with the stabilizing acids. These polymeric materials can have carbonyl, hydroxyl, amide, carboxylic, amine, ether, anhydride, ester, urethane, sulfone or other structures or combination structures capable of coupling or otherwise fixing the acid stabilizer to the isolatable substances. These polymeric materials can also be inorganic such as silicates. Other contemplated particulates are those in which the stabilizers are selectively trapped in zeolytic substances or otherwise caged in molecular sieves.

Chemical isolation can be achieved by, for example, reactive contact with anhydride structures such as on copolymers containing maleic anhydride. It is postulated that the anhydride structure reacts to form an anhydride link with the mobile (stabilizing) acid and a carboxylic group, both being bound to the polymer chain; an example for this being maleic anhydride copolymers of styrene and ethylene.

Physical removal of the excess stabilizers may be accomplished by such substances as activated carbon, which appears to rely on adsorption of the stabilizer(s) as a result of the high surface area and polar surface structures.

These mechanisms of treatment are not meant to be mutually exclusive, but can, in fact, be acting by any and all combinations to remove the excessive stabilizers. A typical example is the use of activated carbon, which has oxidation structures that are likely to participate in hydrogen bonding as well as physical adsorption. A further example is the use of more than one substance, such as polymer(s) and inorganic(s) in a single treatment or sequential or multiple treatments.

To most effectively use stabilized cyanoacrylate adhesives for medical applications in accordance with the invention, they are stored in a device that houses a crushable ampoule containing such adhesives. Such ampoule containing devices maybe constructed of any number of materials that can be shaped or molded or otherwise fabricated to contain the adhesive and ampoule. The application devices are preferably manufactured from such materials as to effect a resilient wall capable of transmitting pressure to the crushable ampoule without loss of its containment properties. These application devices advantageously further comprise a filtering component and nozzle for application of the filtered adhesive to the substrate, for example, tissue of the patient being treated. Examples of application devices which may be used in accordance with the present method are disclosed in detail in the '226 application which, as discussed above, is incorporated herein by reference.

The application devices can also be designed to apply the product in a continuous manner. An example of such a device is one that incorporates a reservoir of the appropriate adhesive feeding through a valving mechanism, thereby providing a source of adhesive without an ampoule.

In multi-application uses the properly treated cyanoacrylate is contained in appropriate vessels such as glass or high density polyethylene. These containers may be pretreated so as to effect useful shelf life. Reference again is made to those familiar with the art and patents delineating the various methods to achieve this treatment. Typically a container would hold 2–5 grams of product to provide many topical applications with appropriate disposable applicators such as pipettes.

In a preferred embodiment, one of the above described devices houses iso-octyl cyanoacrylate which has been previously treated with poly(vinyl pyrrolidone/vinyl acetate) copolymer. The ampoule is crushed and the contents are then expressed through the appropriate filter and dispenser tip onto the substrate, specifically human, or animal tissue, or skin. The application is accomplished in such fashion as to prevent encapsulation of adhesive by any surrounding tissue. Though ultimately these inclusions are degraded and excreted, it is most desirable to minimize this occurrence to maximize reconstitution of the surrounding tissue. The need to assure this minimization was noted in U.S. Pat. No. 3,667,472 which pointed out the requisite to bridge the wound without diffusing into it. This was accomplished by bringing the wound edges together followed by application so as to effect a bridging over the wound to circumvent necrosis and irritation by this technique.

A second preferred embodiment utilizes the above described devices containing iso-decyl cyanoacrylate A third preferred embodiment utilizes the above described devices containing dodecyl cyanoacrylate.

A fourth preferred embodiment includes the above with combinations of cyanoacrylate monomers to achieve control over the rate of hydrolytic degradation so as to improve compatibility with tissue by control of formaldehyde emissions.

In accordance with a preferred embodiment, the invention employs vinyl pyrrolidone polymers and copolymers to remove stabilizers from the cyanoacrylate adhesives formulation. These particulate agents are combined with the monomer adhesive in mutual contact until the adhesive is destabilized, whereupon the adhesive becomes isolated from the destabilizing agent by various means such as to effect isolation of the adhesive from the destabilizing component. Once isolated, the adhesive is restabilized at reduced levels so as to effect timely cure rates in the 5 seconds to approximately one minute range. It should further be understood that these particulate agents may have some degree of solubility and therefore may pass through along with the adhesive onto the substrate. It is only a requisite that enough excess stabilizer is left behind so as to provide the desirable speed of cure. It should be understood that oligomeric or low molecular weight fractions may indeed be somewhat soluble in the cyanoacrylate adhesives but still be effective in producing a desirable adhesive composition.

Advantageously, the device of the invention is one that (a) delivers the cyanoacrylate adhesive of convenient viscosity, (b) contains a porous segment for the containment of the ampoule and other components so as to permit the release of the adhesive with no particulate components being released onto the substrate to which it is applied, (c) delivers the adhesive through a nozzle applicator tip configured for appropriate application onto the substrate, and (d) can be used with other monomer formulations prior to application to effect the desired result such as polymerizations to produce various thermoplastic and thermoset resins of both organic and inorganic nature.

All of preferred embodiments disclosed in accordance with the present invention should be understood to further include all of the various additives useful in the alteration and improvement to cyanoacrylate adhesives as would make them suitable for placement into the above devices, substrates, and modifications to these and similar devices. These can include plasticizers, stabilizers, surface insensitive additives, tougheners, thickeners, adhesion promoters, other monomers, comonomers, and other such compositions as would be evident to those familiar with the cyanoacrylate adhesives art.

The following preferred examples further disclose the new method and display its effectiveness.

EXAMPLE 1

A quantity of particulate destabilizing agent (5 grams) in the form of vinyl pyrrolidone vinyl acetate copolymer is blended with (25 grams) iso-octyl cyanoacrylate for a period of 24 hours. The resultant slurry is filtered to effectively remove the destabilizing agent and is restabilized at a level to achieve the desired cure speed for the following test. In particular, 6 grams of the treated monomer is blended with 0.012 grams of pretreated monomer. A glass ampoule is charged with 0.5 grams of treated monomer and sealed with a gas flame. The ampoule is inserted into a tubular device referred to as a Tandem Dropper supplied by James Alexander Company of Blairstown, N.J., that also provided unsealed ampoules. In order to filter matter dispensed from the dispenser tip of the Tandem Dropper, it is plugged internally with a small wad of polyester fiber also supplied by James Alexander Company. The dispenser tip press fits onto the end of the Tandem Dropper after insertion of the sealed ampoule.

The assembled device is squeezed to effect rupture of the ampoule. Pressure is applied so as to exude a drop of adhesive through the filtering tip. The drop is applied to skin and timed to determine when the film has undergone cure to a non-tacky surface. The iso-octyl cyanoacrylate undergoes cure in 10–20 seconds upon application to skin on the back of the hand. This contrasts with untreated iso-octyl cyanoacrylate which shows no sign of cure up to 3 minutes whereupon the test is terminated.

EXAMPLE 2

A 10 milliliter glass vial is charged with 0.5 grams of activated charcoal Calgon WPX, sourced from Calgon Carbon Corp. of Pittsburgh Pa. Followed by this is a 6.0 gram charge of iso-octyl cyanoacrylate which is mixed for a period of 30 minutes. The resulting dispersion is filtered to isolate the cyanoacrylate into a small ampoule. A test of cure speed on skin of the isolated monomer results in the formation of a protective film in 10 to 20 seconds in a manner similar to example 1 above.

EXAMPLE 3

A 3 milliliter test tube is charged with 0.016 grams of anhydrous potassium carbonate and 2.030 grams of iso-octyl cyanoacrylate which is then sealed and shaken for approximately 2 hours. It is stored for 17 days. A sample is removed and applied to the skin with a consequent film cure in a range of 110 to 120 seconds.

EXAMPLE 4

Example 3 is repeated with a higher loading of the anhydrous carbonate: 0.27 grams and 2.46 grams of iso-octyl cyanoacrylate. The test tube is stored for 15 days whereupon a test of cure exhibits film formation in 120 seconds.

EXAMPLE 5

A 50 milliliter flask is charged and sealed with 1.5 grams of polyvinyl alcohol granules (BP-05) and 18.5 grams of iso-octyl cyanoacrylate. The dispersion is intermittently shaken for a period of 48 hours due to the more coarse nature of the polymer. A sample is taken and tested on skin to show a cure of film in 90 to 100 seconds.

EXAMPLE 6

A flask is charged and sealed with 1.0 grams of ethylene-vinyl acetate copolymer RP251 (Wacker Polysystems) and 18.5 grams of iso-octyl cyanoacrylate. The dispersion is intermittently shaken for 48 hours prior to the skin test. Upon testing the treated monomer cured in approximately 100 seconds

EXAMPLE 7

Example 6 is repeated with RP140, a vinyl acetate homopolymer. The resultant treated monomer gave a cure after 130 seconds.

EXAMPLE 8

A 10 milliliter flask is charged and sealed with 1.0 grams of poly(methyl methacrylate) (Rhohadon M449, Rohmtech Inc.) and 6 grams of iso-octyl cyanaocrylate After intermittent shaking for 24 hours, the dispersion is filtered and the isolated monomer is tested to reveal a film formation in 30 to 35 seconds.

EXAMPLE 9

A 10 milliliter flask is charged and sealed with 1.0 grams of styrene-maleic anhydride copolymer (SMA-3000, Atochem Inc.) and 6 grams of iso-octyl cyanaocrylate. Subsequent isolation of the monomer after 24 hours of treatment gave a cured film on skin in approximately 65 seconds.

EXAMPLE 10

A 10 milliliter flask is charged and sealed with 0.5 grams of zinc oxide (AZO66, US Zinc Products Inc.) and 6 grams of iso-octyl cyanaocrylate After shaking the dispersion for 30 minutes, subsequent filtration and testing on skin gave a cure in 50 to 60 seconds.

EXAMPLE 11

A 10 milliliter flask is charged and sealed with 0.5 grams of "Hydrosource" (1–2 mm average diameter particles)

polyacrylamide (Castle International) and 6.0 grams of iso-octyl cyanoacrylate. Subsequent testing after 4 hours of mixing gave a 30 second cure on skin.

EXAMPLE 12

A 10 milliliter flask is charged and sealed with 1.6 grams of glass spheres (Class 4A size 203 from Cataphote Corp.) and 4.4 grams of iso-octyl cyanoacrylate. The mix was shaken for 2 hours prior to testing. The sampled droplet was spread on skin giving a 60 second cure.

EXAMPLE 13

A 10 milliliter flask is charged and sealed with 1.6 grams of pulverized polyimide resin (Dupont Kapton 700HPP-ST film) and 4.4 grams of iso-octyl cyanoacrylate. The mix was shaken overnight prior to testing. An isolated sample gave a skin surface cure of 120 seconds.

EXAMPLE 14

A two ounce opaque polyethylene bottle is charged with 0.57 grams of vinyl pyrrolidone vinyl acetate copolymer and 30 grams of iso-octyl cyanoacrylate. The container is shaken for five minutes and stored for 3 months. A sample was taken and passed through a 0.2 micron filter with a 1 milliliter syringe. Application onto skin gave a very rapid cure of 10–15 seconds with a noticeable warmth due to the more rapid polymerization.

As evidenced by the last example, these additives can be left in contact with the cyanoacrylate with no apparent detriment to the shelf life and cure of the final product. It is further evident that these products can be kept without the need to isolate and store in glass ampoules. This further leads to the capability of large reservoirs of product to be dispensable through a disposable fibrous or porous tip. This is particularly advantageous in procedures where quantities necessary exceed the capacity of the crushable ampoules. The only limitations to the various treatments is the ability to isolate a practical level of cyanoacrylate monomer, i.e., that concentrations even at levels creating slurries can be filtered off to achieve economic quantities. These examples serve to show the extensive applicability of the primary requisite: to remove excessive stabilizer(s). No other references have addressed this issue, as those knowledgeable in the science and art of this technology have always understood the need to add, not remove, these stabilizing substances. It has not previously been recognized that the synthesis and isolation of these long chain side group cyanoacrylates results in excessive levels of these stabilizers. The preceding examples are intended to show the various types of cyanoacrylate insoluble materials that can perform the extraction of stabilizers. They are therefore intended to exemplify, not define the limits, of applicable substances.

While the preferred embodiments have been shown and described, it will be understood that there is no intent to limit the invention by such disclosure, but rather, is intended to cover all modifications and alternate constructions falling within the spirit and scope of the invention as defined in the appended claims.

I claim:

1. A method for the fabrication of a cyanoacrylate adhesive so as to minimize the presence of contaminants and extraneous additives in the resulting cured adhesives and enhancing the cure speed of stabilized cyanoacrylate adhesive by a treatment that removes excessive stabilizers prior to application onto a substrate, the method comprising the steps of (a) providing a stable adhesive composition comprising cyanoacrylate adhesive and a stabilizing agent to produce a cyanoacrylate adhesive composition, (b) presenting a substrate to receive at least a portion of the cyanoacrylate adhesive composition and (c) applying the cyanoacrylate adhesive composition to the substrate, the improvement comprising the step of removing stabilizing agent from the cyanoacrylate adhesive composition prior to the step of applying, wherein the step of removing stabilizing agent from the cyanoacrylate adhesive composition consists essentially of contacting the cyanoacrylate composition with a particulate agent and subsequently isolating the particulate agent and the stabilizing agent from the cyanoacrylate adhesive via an isolation process.

2. The method according to claim 1, wherein the cyanoacrylate adhesive comprises one or more monomers having the general structure.

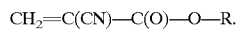

$$CH_2=C(CN)-C(O)-O-R.$$

3. The method according to claim 2, wherein "R" is selected from the group consisting of octyl, decyl, dodecyl, and tridecyl.

4. The method according to claim 2, wherein the cyanoacrylate adhesive incorporates a difunctional bis cyanoacrylate.

5. The method according to claim 1, wherein the particulate agent is selected from the group consisting of polyvinylpyrrolidone and copolymers thereof.

6. The method according to claim 1, wherein the particulate agent is selected from the group consisting of polymeric materials having carbonyl, hydroxyl, amide, carboxylic, amine, ether, anhydride, ester, urethane or sulfone structures, silicates and activated carbon.

7. The method according to claim 1, wherein the substrate is tissue required to be sutured or sealed, or otherwise protected from its surroundings.

8. The method according to claim 1, wherein the step of removing excess stabilizing agent is chosen from the group of mechanisms consisting of physical adsorption/absorption, chemical reaction, and hydrogen bonding of acid groups.

9. A method for the fabrication of a cyanoacrylate adhesive so as to minimize the presence of contaminants and extraneous additives in the resulting cured adhesives and enhancing the cure speed of stabilized cyanoacrylate adhesive by a treatment that removes excessive stabilizers prior to application onto a substrate, the method comprising the following steps:

providing stable adhesive composition comprising cyanoacrylate adhesive and a stabilizing agent to produce a cyanoacrylate adhesive composition;

removing stabilizing agent from the cyanoacrylate adhesive composition, wherein the step of removing stabilizing agent from the cyanoacrylate adhesive composition consists essentially of contacting the cyanoacrylate composition with a particulate agent and subsequently isolating the particulate agent and the stabilizing agent from the cyanoacrylate adhesive via an isolation process;

presenting a substrate to receive at least a portion of the cyanoacrylate adhesive composition; and applying the cyanoacrylate adhesive composition to the substrate.

10. The method according to claim 9, wherein the cyanoacrylate adhesive comprises one or more monomers having the general structure.

$$CH_2=C(CN)-C(O)-O-R.$$

11. The method according to claim 10, wherein "R" is selected from the group consisting of octyl, decyl, dodecyl, and tridecyl.

12. The method according to claim 10, wherein the cyanoacrylate adhesive incorporates a difunctional bis cyanoacrylate.

13. The method according to claim 9, wherein the particulate agent is selected from the group consisting of polyvinylpyrrolidone and copolymers thereof.

14. The method according to claim 9, wherein the particulate agent is selected from the group consisting of polymeric materials having carbonyl, hydroxyl, amide, carboxylic, amine, ether, anhydride, ester, urethane or sulfone structures, silicates and activated carbon.

15. The method according to claim 9, wherein the substrate is tissue required to be sutured or sealed, or otherwise protected from its surroundings.

16. The method according to claim 9, wherein the step of removing excess stabilizing agent is chosen from the group of mechanisms consisting of physical adsorption/absorption, chemical reaction, and hydrogen bonding of acid groups.

* * * * *